(12) United States Patent
Nakata (10) Patent No.: US 7,181,750 B2
(45) Date of Patent: Feb. 20, 2007

(54) DISC DRIVE APPARATUS

(75) Inventor: Eiji Nakata, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 500 days.

(21) Appl. No.: 10/622,609

(22) Filed: Jul. 18, 2003

(65) Prior Publication Data

US 2004/0022140 A1 Feb. 5, 2004

(30) Foreign Application Priority Data

Aug. 1, 2002 (JP) .............................. 2002-225013

(51) Int. Cl.
*G11B 33/12* (2006.01)
(52) U.S. Cl. ..................................... 720/646
(58) Field of Classification Search ................ 361/685; 710/60; 702/154; 342/389; 720/646
See application file for complete search history.

(56) References Cited

U.S. PATENT DOCUMENTS

| 4,383,259 A | * | 5/1983 | Rader .......................... 342/389 |
| 4,486,844 A | * | 12/1984 | Brunson et al. ............. 702/154 |
| 5,838,995 A | * | 11/1998 | Chen et al. ................... 710/60 |
| 6,061,232 A | * | 5/2000 | Ho .............................. 361/685 |
| 2002/0007447 A1 | | 1/2002 | Oue ............................ 711/162 |

FOREIGN PATENT DOCUMENTS

| JP | 91-70201 | 5/1986 |
| JP | 09-63395 | 3/1997 |
| JP | 09063395 A | * 3/1997 |
| JP | 9-146713 | 6/1997 |
| JP | 11-54018 | 2/1999 |

(Continued)

OTHER PUBLICATIONS

Japanese Office Action dated Dec. 10, 2004 (5 pages).
Patent Abstracts of Japan; Publication No. 11-249824 dated Sep. 17, 1999 (1 page).
Patent Abstracts of Japan; Publication No. 09-063395 dated Mar. 7, 1997 (1 page).

(Continued)

*Primary Examiner*—Tianjie Chen
(74) *Attorney, Agent, or Firm*—Osha Liang LLP (57) ABSTRACT

In a disc drive apparatus, provided in the front face thereof is a changeover switch for changing over settings between a master and a slave in working of disc drive apparatus. Changeover switch is electrically connected to a substrate in the interior thereof by a cable. A cover is provided near the front face of changeover switch so as to cover it. A prescribed lock mechanism is provided to cover so that cover is neither opened erroneously nor changed over in operation of disc drive apparatus. A previous locking of lock mechanism is cancelled in a state where disc drive apparatus in out of operation, thereby enabling changeover between settings of a master and a slave in working. With such a construction adopted, a disc drive apparatus is obtained in which change over is easily performed between settings of a master and a slave in working thereof and a set state thereof is immediately confirmed.

8 Claims, 7 Drawing Sheets

FOREIGN PATENT DOCUMENTS

| | | |
|---|---|---|
| JP | 11-249824 | 9/1999 |
| JP | 2000-81978 | 3/2000 |
| JP | 2001-135010 | 5/2001 |
| JP | 2002-23965 | 1/2002 |
| JP | 2002-32198 | 1/2002 |

OTHER PUBLICATIONS

Patent Abstracts of Japan; Publication No. 11-054018 dated Feb. 26, 1999 (1 page).

Comments on Japanese Patent Laying-Open No. 2002-32198 (Jan. 31, 2002) previously filed in an IDS for this matter on Jul. 18, 2003, 1 pg.

Comments on Japanese Patent Laying-Open No. 2002-23965 (Jan. 25, 2002) previously filed in an IDS for this matter on Jul. 18, 2003, 1 pg.

Comments on Japanese Patent Laying-Open No. 2001-135010 (May 18, 2001) previously filed in an IDS for this matter on Jul. 18, 2003, 1 pg.

Comments on Japanese Patent Laying-Open No. 2000-81978 (Mar. 21, 2000) previously filed in an IDS for this matter on Jul. 18, 2003, 1 pg.

Comments on Japanese Patent Laying-Open No. 9-146713 (Jun. 06, 1997) previously filed in an IDS for this matter on Jul. 18, 2003, 1 pg.

Comments on Japanese Patent Laying-Open No. 61-70201 (May 14, 1986) previously filed in an IDS for this matter on Jul. 18, 2003, 1 pg.

* cited by examiner

DISC DRIVE APPARATUS

BACKGROUND OF THE INVENTION

1. Field of the Invention

The present invention relates to a disc drive apparatus, and particularly, to a disc drive apparatus equipped with a master-slave setting changeover switch.

2. Description of the Background Art

Installation of data such as, for example, application software or the like into a personal computer is implemented generally by reading the application software or the like written in a CDROM (Compact Disc Read-Only Memory) with a disc drive apparatus equipped to the personal computer.

Software read with the disc drive apparatus is thus installed in a hard disc drive equipped in the personal computer.

On the other hand, in a case where data stored on a hard disc is stored into, for example, CD-R (Compact Disc-Recordable), the data is written onto a CD-R with a disc drive apparatus.

In such a way, data is received and supplied between a disc drive apparatus and a hard disc drive, equipped to a personal computer.

There has been available a personal computer equipped with a plurality of disc drive apparatuses for a hard disc drive therein. In such a personal computer, management and control are performed by an operating system (OS) so as to cause reception and supply of data to be smoothly performed not only between each of the plurality of disc drive apparatuses and the hard disc drive, but also between the plurality of disc drive apparatuses.

Especially, in a personal computer equipped with a plurality of disc drives, one of the plurality of disc drive apparatuses is used being set as a master, playing a primary role, and the others are used being set as slaves, playing a secondary, tertiary or the like role.

A personal computer is controlled by an operating system as described above. If an operating system thereof is however updated in version, for example, a case arises where neither reception nor supply of data is smoothly performed between each of the plurality of disc drive apparatuses and the hard disc drive, or between the plurality of disc drive apparatuses.

Generally, in such a case, the inconvenience is dealt with by adapting an environment within the personal computer using software therefor or alternatively changing a changeover switch, equipped to a disc drive apparatus, over between settings of a master and a slave in working of the disc drive apparatus.

Methods using software are disclosed in, for example, Japanese Paten Laying-Open No. 2001-135010, Japanese Paten Laying-Open No. 9-146713, Japanese Utility Model Laying-Open No. 61-70201 or the like. Methods using a changeover switch are disclosed in, for example, Japanese Paten Laying-Open No. 2000-81978, Japanese Paten Laying-Open No. 2002-23965, Japanese Paten Laying-Open No. 2002-32198 or the like.

In a case where changeover is performed between a master and a slave in working using software, a changeover manipulation itself is easily done, whereas a problem has existed that it cannot be immediately confirmed whether a disc drive apparatus is currently in a master status or in a slave status.

Figure 14:
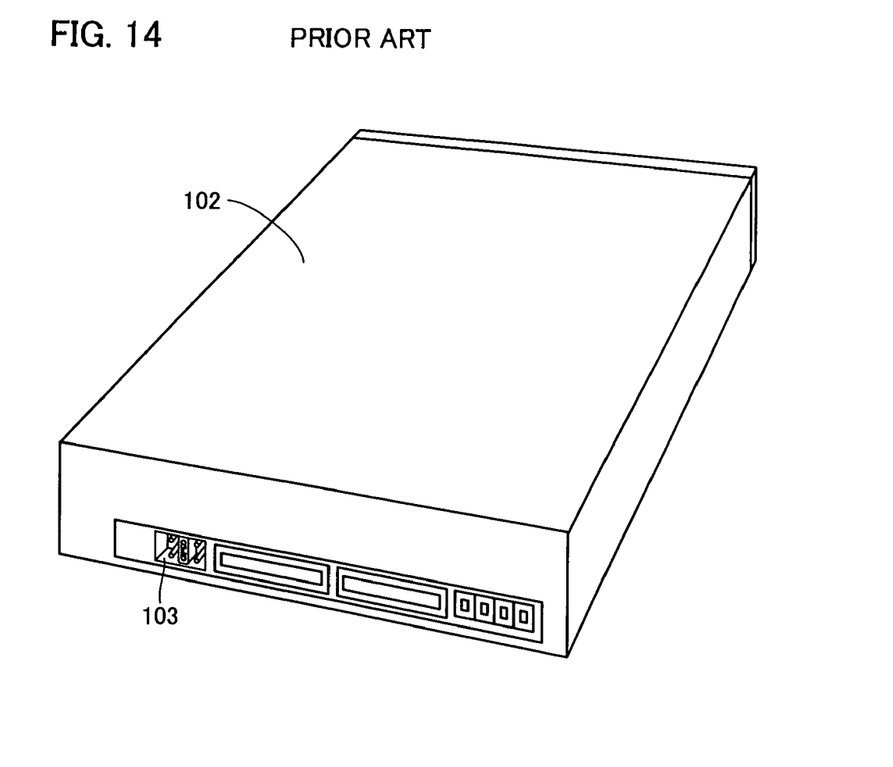
FIG. 14 is a perspective view showing a conventional disc drive apparatus.

On the other hand, in a case where a changeover switch is used for changeover between a master and a slave in working, the changeover is achieved as shown in FIG. 14 by manipulating a prescribed jumper switch 103 provided on the back face of disc drive apparatus 102.

Figure 15:
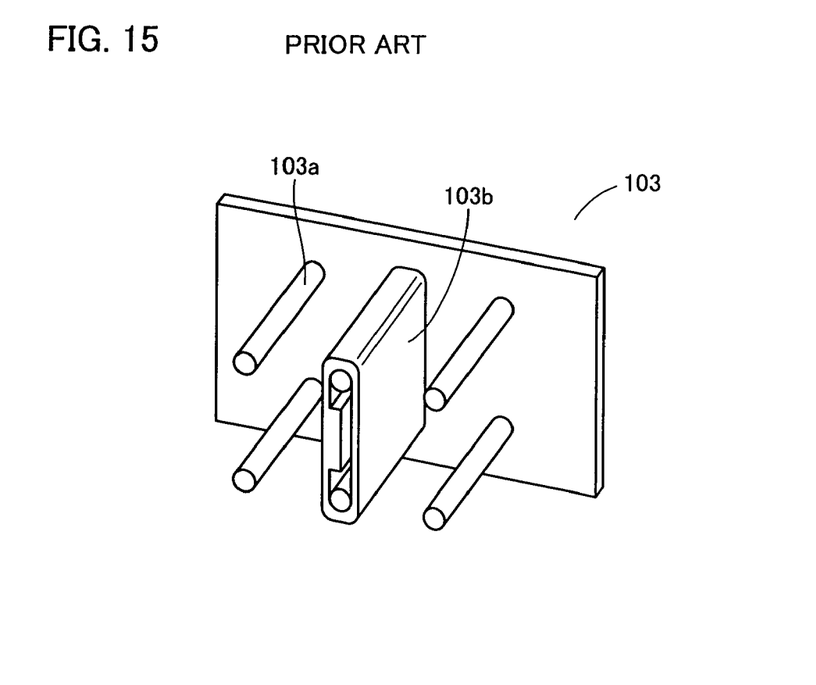
FIG. 15 is a perspective view showing a changeover switch of a conventional disc drive apparatus.

In jumper switch 103, as shown in FIG. 15, a jumper socket 103$b$ is mounted in place to be connected to a plurality of pins 103$a$ so that prescribed pins 103$a$ are electrically connected to each other. A change is done in combination of pins 103$a$ electrically connected to each other, thereby changing over between a master and a slave in working of disc drive apparatus 102.

Jumper switch 103 is, however, provided on the back face of disc drive apparatus 102 as described above. Therefore, if changeover is performed between settings of a master and a slave in working of disc drive apparatus 102, a necessity arises for opening a cover of a case of a personal computer (not shown) to change over between settings in jumper switch 103. Furthermore, since jumper socket 103$b$ of jumper switch 103 is very small in size, leading to inconvenience in handling.

Therefore, it takes a time in manipulation of puling off and inserting of jumper socket 103$b$, having resulted in a problem that no easy changeover is performed between settings of a master and a slave in working of disc drive apparatus 102.

SUMMARY OF THE INVENTION

The present invention has been made in order to solve the problem described above and it is an object of the present invention to provide a disc drive apparatus capable of not only performing changeover between settings of a master and a slave in working thereof with ease, but also immediately confirming a set status of a disc drive apparatus between a master and a slave in working thereof.

A disc drive apparatus pertaining to the present invention is a disc drive apparatus for reading information from or writing information onto a prescribed disc and includes: a changeover switch, a cover and a lock mechanism. The changeover switch is provided on a front face portion and used for altering settings between a master and a slave in working of a disc drive body. The cover is provided so as to cover the changeover switch. The lock mechanism locks the cover, including: a pair of electromagnets; an opening; and a protrusion. The pair of electromagnets are arranged so as to face each other. The opening is formed in the cover. The protrusion is disposed on one of the pair of electromagnets at a location where it is inserted through the opening by the action of the pair of electromagnets in an on state while, in an off state, being disposed at a location where it is not inserted through the opening by the action of the pair of electromagnets.

According to the construction, provided in the front face thereof is a changeover switch for altering settings between a master and a slave in working of the disc drive body, thereby enabling immediate confirmation of a set status of the disc drive apparatus between a master and a slave in working thereof. Furthermore, in comparison with a case where changeover is performed with a jumper switch provided on the back face as in a conventional disc drive apparatus, a changeover manipulation become greatly easier. Moreover, since the cover covering the changeover switch is locked in an on state by the lock mechanism, a wrong manipulation of the changeover switch is prevented in operation.

Another disc drive apparatus pertaining to the present invention is a disc drive apparatus for reading information from or writing information onto a prescribed disc and includes: a changeover switch and a lock mechanism. The changeover switch is provided on a front face portion and used for altering settings between a master and a slave in working of a disc drive body. The lock mechanism prevents manipulation of the changeover switch in an on state.

According to the construction, provided in the front face thereof is a changeover switch for altering settings between a master and a slave in working of the disc drive body, thereby enabling immediate confirmation of a set status of the disc drive apparatus between a master and a slave in working thereof. Furthermore, in comparison with a case where changeover is performed with a jumper switch provided on the back face as in a conventional disc drive apparatus, a changeover manipulation become greatly easier. Moreover, since the cover covering the changeover switch is locked in an on state by the lock mechanism, a wrong manipulation of the changeover switch is prevented in operation.

The lock mechanism, to be more concrete, preferably includes: a cover provided so as to cover the changeover switch in an on state and an opening/closing check section for preventing the cover from opening in an on state.

With such a construction, since the cover does not open in operation, the changeover switch can be prevented with certainty from being erroneously manipulated in operation.

The opening/closing check section preferably includes: a pair of electromagnets provided so as to face each other; an opening formed in the cover; and a protrusion disposed on one of the pair of electromagnets so that it is inserted through the opening by the action of the pair of electromagnets in an on state while, in an off state, being disposed so that it is not inserted through the opening by the action of the pair of electromagnets.

In this case, currents are caused to flow through the electromagnets so as to be adapted for whether or not the disc drive body is in or out of operation, thereby enabling preventing the cover from opening in operation with certainty.

Furthermore, the opening/closing check section preferably includes a drive section for performing opening and closing of the cover.

In this case, since opening and closing of the cover are performed by driving the drive section, the cover cannot be opened without driving the drive section once the cover is closed; therefore, the cover can be prevented from opening in operation with certainty.

Moreover, the cover is preferably made of a transparent resin.

With the cover made of transparent resin, even in a case where the changeover switch is covered by the cover, easy confirmation is enabled on a set status of a changeover switch.

In addition, it is preferable that an access lamp that is lit on in operation is provided in the vicinity of the cover and light from the access lamp is directed to the cover so that the cover is illuminated therewith.

In this case, not only can it be easily confirmed that the disc drive body is in operation, but it can also confirm that in this state, the changeover switch is not allowed to be manipulated and in addition, the cover cannot be opened.

Alternatively, the lock mechanism also preferably prevents displacement of the body of the changeover switch when the changeover switch is changed over.

In this case, manipulation of the changeover switch can be prevented without providing an additional member such as the cover.

To be more concrete, the lock mechanism preferably includes: one opening provided in the changeover switch body; and a protrusion provided thereon so that it is inserted through the opening in an on state, while being not inserted through the opening in an off state.

With such a construction, it can be prevented that the protrusion is inserted through the opening and thereby erroneously manipulated in operation.

Furthermore, the changeover switch and the lock mechanism are preferably assembled into one unit.

With such a construction, the changeover switch and the lock mechanism can be easily assembled into a disc drive apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
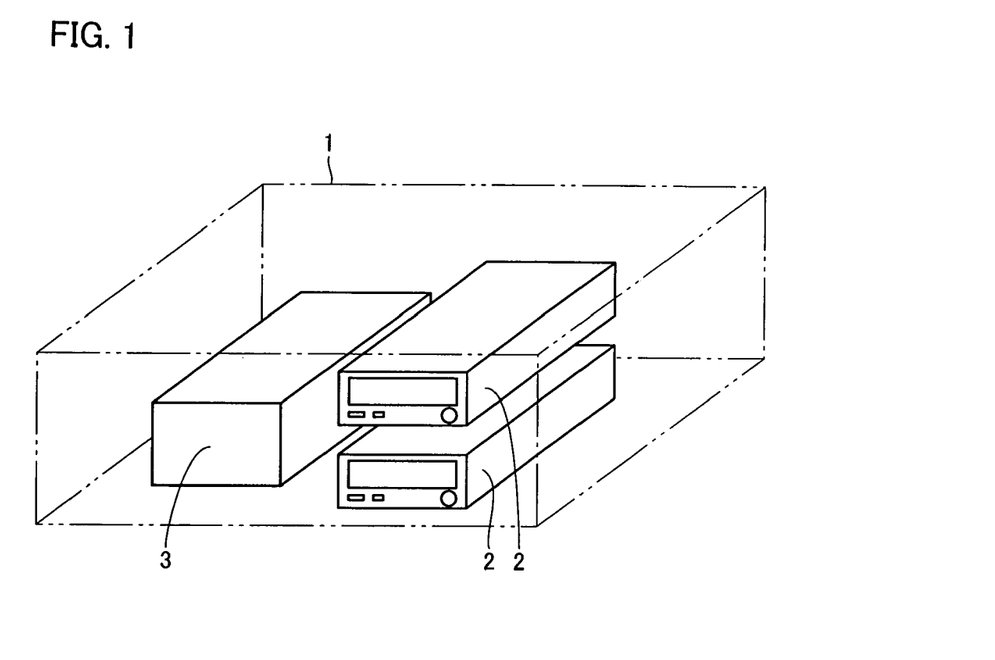
FIG. 1 is a perspective view of a disc drive apparatus pertaining to an embodiment of the present invention.

Description will be given of a disc drive apparatus pertaining to an embodiment of the present invention. A personal computer is, as shown in FIG. 1, equipped with: two disc drive apparatuses 2; and one hard disc drive apparatus 3. Disc drive apparatuses 2 and hard disc drive apparatus 3 are controlled by an operating system.

Figure 2:
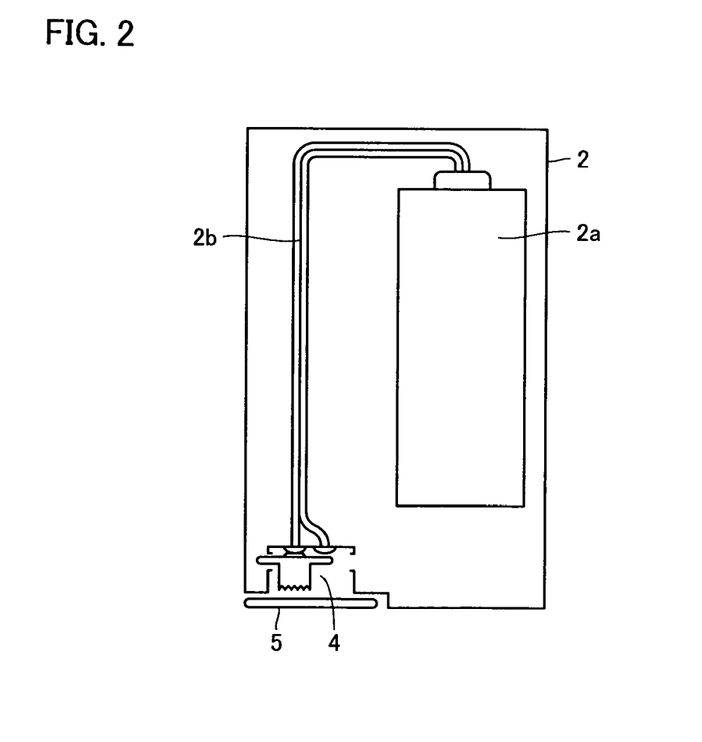
FIG. 2 is a top view showing the interior of the disc drive apparatus in the same embodiment.
Figure 3:
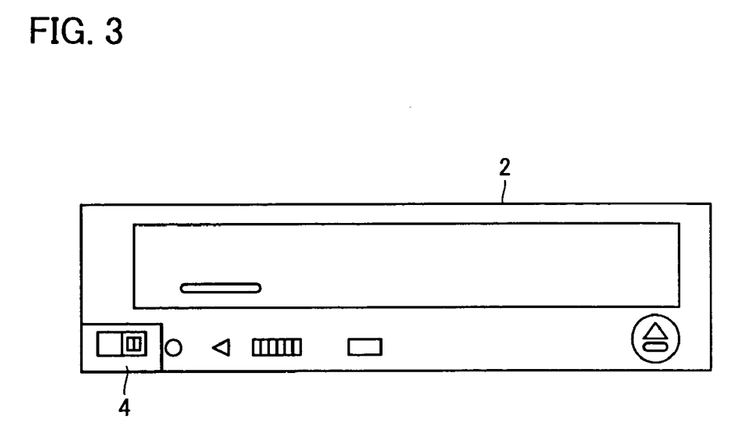
FIG. 3 is a front view of the disc drive apparatus in the same embodiment.

Detailed description will be given of disc drive apparatus 2. As shown in FIGS. 2 and 3, disc drive apparatus 2 includes: a changeover switch 4 for changing over between settings of a master and a slave in working of disc drive apparatus 2, provided on a front panel thereof. Changeover switch 4 is electrically connected to an internal substrate 2a by a cable 2b.

Figure 4:
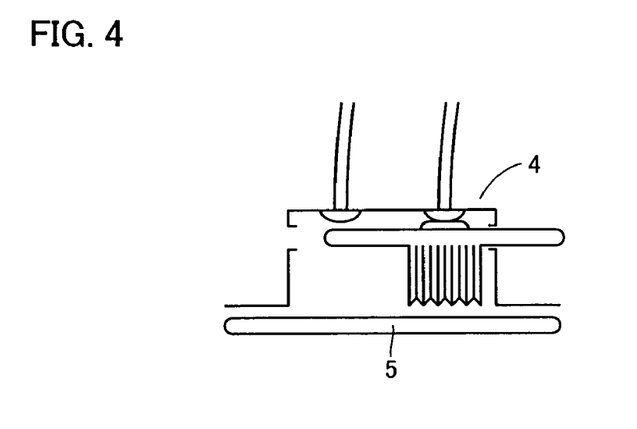
FIG. 4 is a plan view showing a changeover switch provided to the disc drive apparatus in the same embodiment.

As shown in FIG. 4, on the front face of the changeover switch 4, a cover 5 is provided so as to cover changeover switch 4. A prescribed lock mechanism is provided to cover 5 so that cover 5 is not erroneously opened in operation of disc drive apparatus 2 and therefore, changeover switch 4 is not changed over. The lock mechanism works in operation of disc drive apparatus 2.

On the other hand, a previous locking of the lock mechanism is cancelled in a state where disc drive apparatus 2 is out of operation. Therefore, changeover between settings of a master and a slave in working of disc drive apparatus is implemented by opening cover 5 in a state where disc drive apparatus 2 is out of operation.

Figure 5:
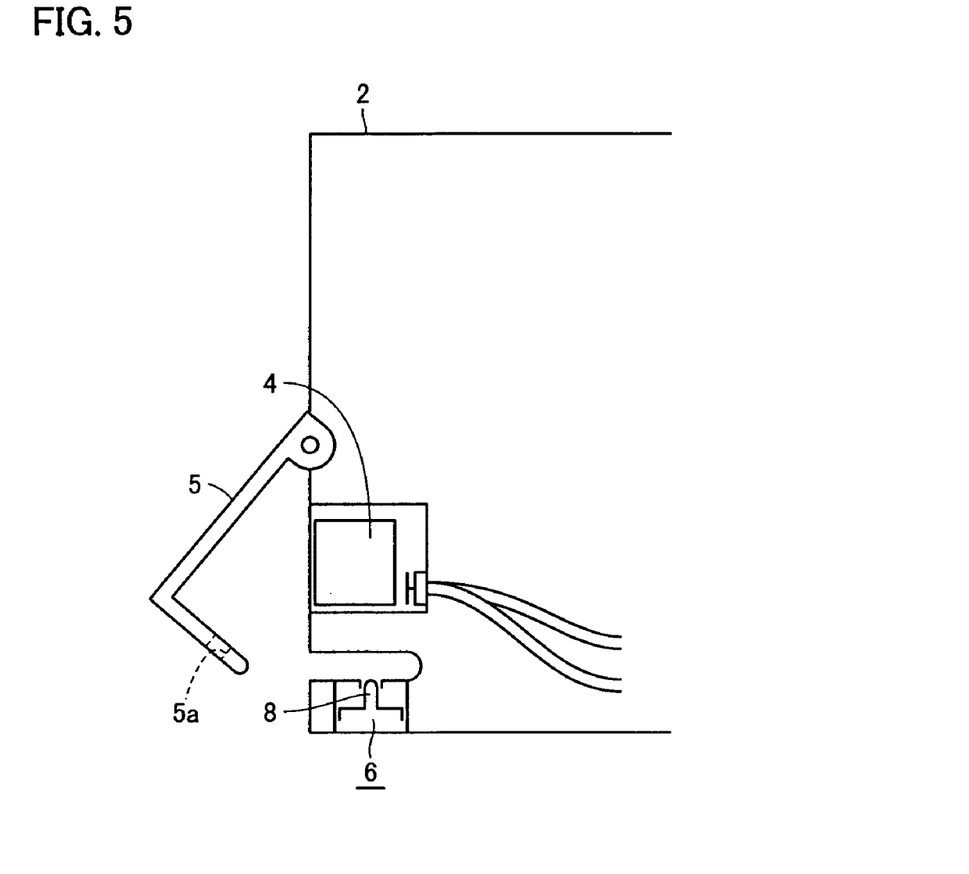
FIG. 5 is a side view showing the changeover switch and a lock mechanism provided to the disc drive apparatus in the same embodiment.
Figure 6:
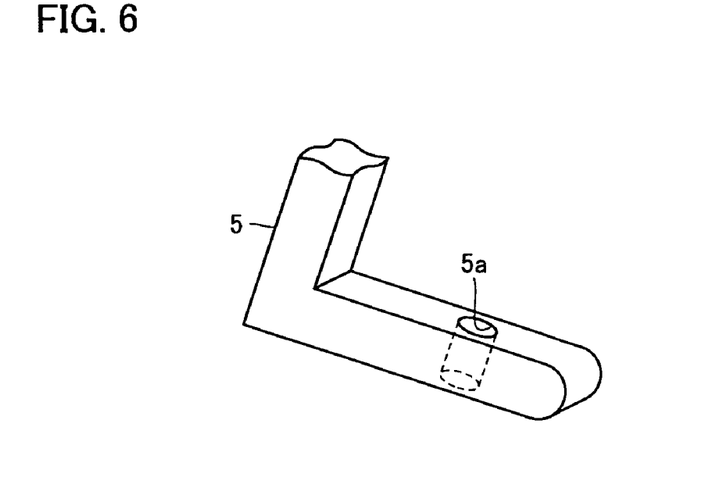
FIG. 6 is a partially enlarged, perspective view showing a cover shown in FIG. 5 in the same embodiment.

Then, detailed description is given of the lock mechanism. As shown in FIGS. 5 and 6, a through-hole 5a is formed in cover 5. A protrusion 8 of lock mechanism 6 is inserted in through-hole 5a by lock mechanism 6 to thereby lock cover 5 in operation of disc drive apparatus 2.

Figure 7:
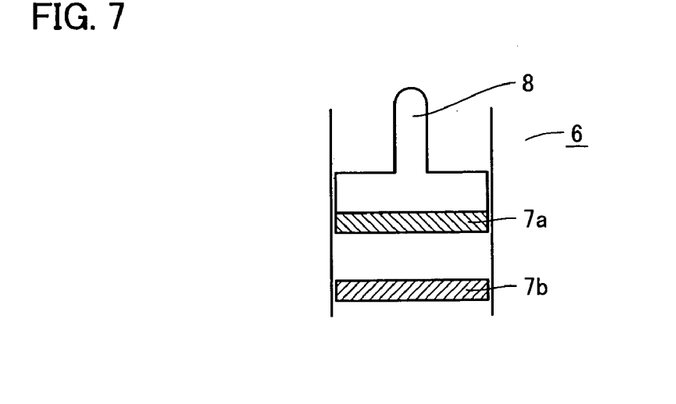
FIG. 7 is a side view showing a structure of the lock mechanism in the same embodiment.

As shown in FIG. 7, protrusion 8 is supported by an electromagnet 7a and another electromagnet 7b is provided below electromagnet 7a. Currents are caused to flow through electromagnets 7a and 7b in a manner to be interlocked with ON and OFF operations, respectively, of disc drive apparatus.

Figure 8:
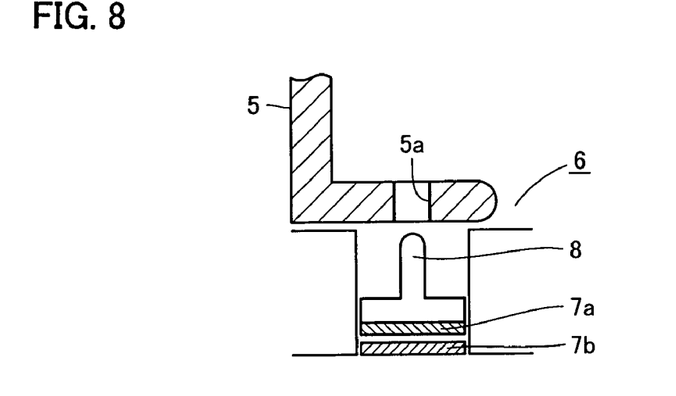
FIG. 8 is a first side view for description of workings of the lock mechanism in the same embodiment.

In a state where disc drive apparatus 2 is out of operation, electromagnets 7a and 7b are attracted by each other to thereby cause protrusion 8 to be in a position not to be inserted into through-hole 5a. In this state, cover 5 can be opened; therefore, changeover is performed between a master and a slave in working of disc drive apparatus 2.

Figure 9:
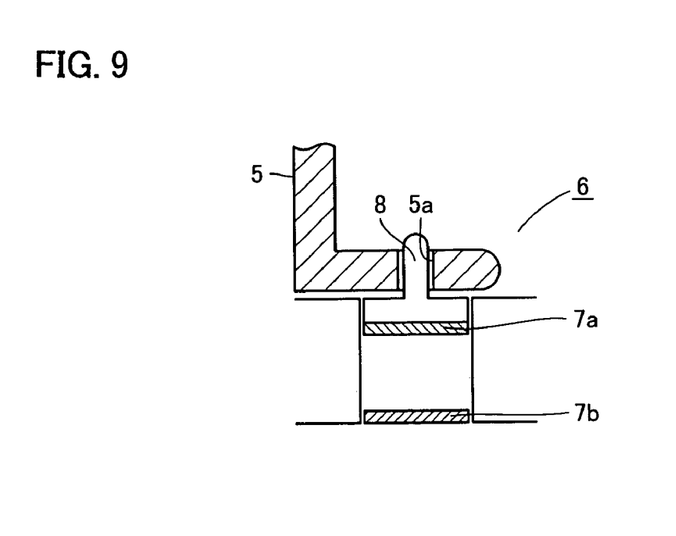
FIG. 9 is a second side view for description of workings of the lock mechanism in the same embodiment.

On the other hand, while disc drive apparatus 2 is in operation, electromagnets 7a and 7b are repelled from each other to thereby cause protrusion 8 to be inserted in through-hole 5a of cover 5. With protrusion 8 inserted in through-hole 5a, cover 5 cannot be opened, thereby enabling prevention of changing over of changeover switch 0.4 in error in operation of disc drive apparatus 2.

According to disc drive apparatus 2 described above, in this way, master-slave setting changeover switch 4 is provided on the front panel thereof, thereby enabling immediate confirmation on a currently set status of disc drive apparatus 2 between a master and a slave in working thereof.

In comparison with a conventional disc drive apparatus, the changeover manipulation is greatly simpler and more convenient because of no necessity for handling a jumper socket.

Furthermore, by providing cover 5 covering changeover switch 4 and lock mechanism 6, it can be prevented that changeover switch 4 is erroneously changed over in operation of disc drive apparatus 2.

In disc drive apparatus 2 described above, cover 5 and lock mechanism 6 locking cover 5 are exemplified with description thereof in order to prevent erroneous changeover of changeover switch 4 in operation of disc drive apparatus 2, which will be followed by description of example modifications.

Figure 10:
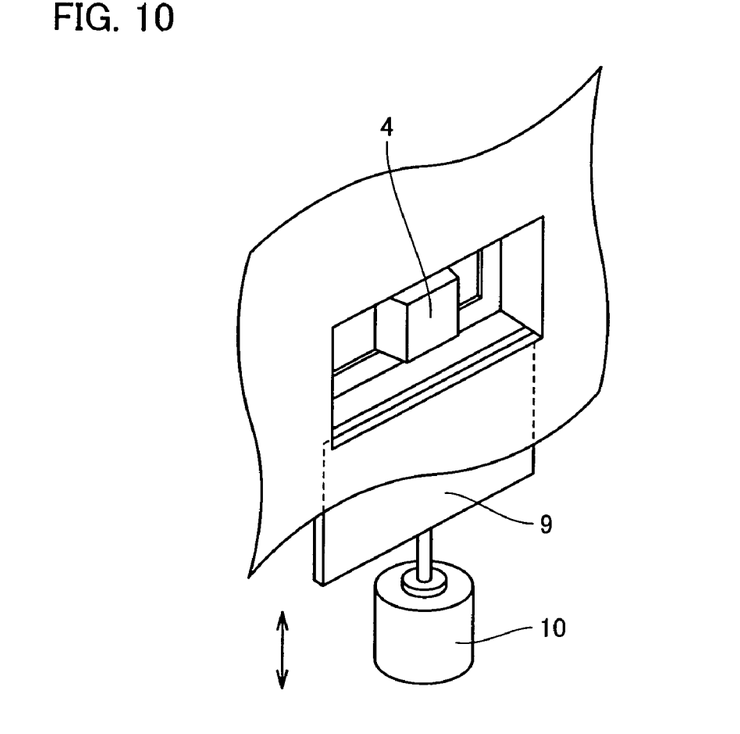
FIG. 10 is a perspective view showing an example modification of the changeover switch and the lock mechanism combined in the same embodiment.

As shown in FIG. 10, disc drive apparatus 2 is provided with a transparent shutter 9 for covering the front face of changeover switch 4; and a solenoid 10 for opening and closing shutter 9.

Shutter 9 is raised by solenoid 9 to close so that changeover 4 is not changed over during operation of disc drive apparatus. On the other hand, while disc drive apparatus is out of operation, shutter 9 stays in a lowered state and changeover switch 4 can be changed over.

Note that with shutter 9 made of a transparent resin adopted, it can be easily confirmed whether changeover switch 4 is in a master status or a slave status even in a state where shutter 9 is closed.

Figure 11:
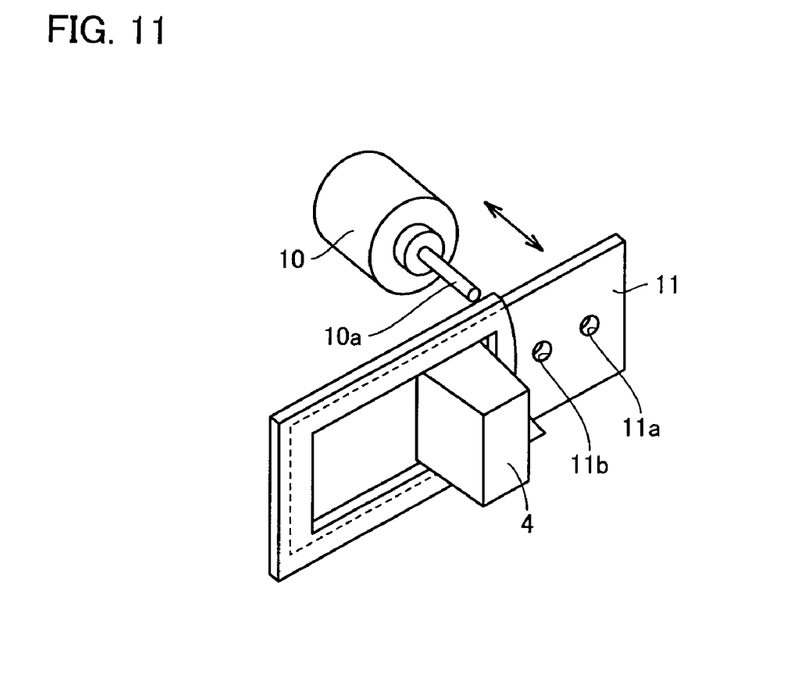
FIG. 11 is a perspective view showing another example modification of the changeover switch and the lock mechanism combined in the same embodiment.

As shown in FIG. 11, prescribed two openings 11a and 11b are formed in a support plate 11 supporting changeover switch 4. A shaft 10a of solenoid 10 is inserted through two openings 11a and 11b in operation of disc drive apparatus to thereby, prevent a sliding motion of changeover switch 4 and to in turn, retain a master or slave status of changeover switch 4.

For example, if the status of changeover switch 4 shown in FIG. 11 is of a master, shaft 10a is inserted through opening 11b to thereby retain a master status. On the other hand, if the status of changeover switch 4 slid to the left side of support plate 11, as viewed from forward it, is of a slave, shaft 10a is inserted through opening 11a to thereby retain a slave status.

Figure 12:
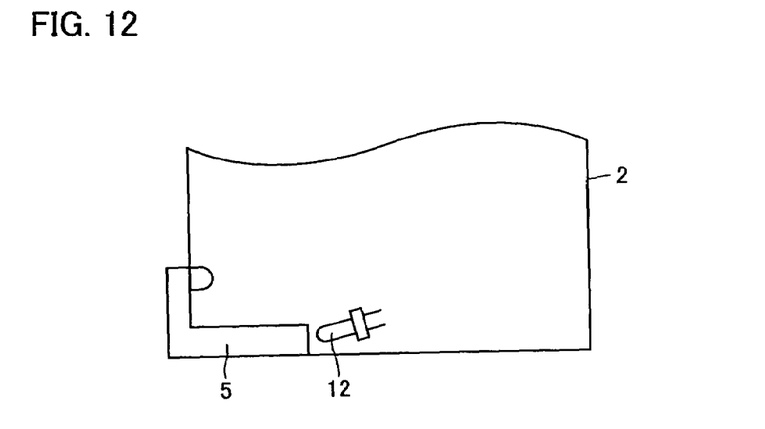
FIG. 12 is a view showing an example modification of a cover covering a changeover switch in the same embodiment.

Note that it is also recommended that not only is a cover made of a transparent resin used as cover 5 covering changeover switch 4, but a light emitting diode 12 is provided near cover 5 as shown in FIG. 12.

Light emitting diode 12 is set so as to emit light during operation of disc drive apparatus 2 as an access lamp and such a construction shows with ease that cover 5 is in locked state.

Figure 13:
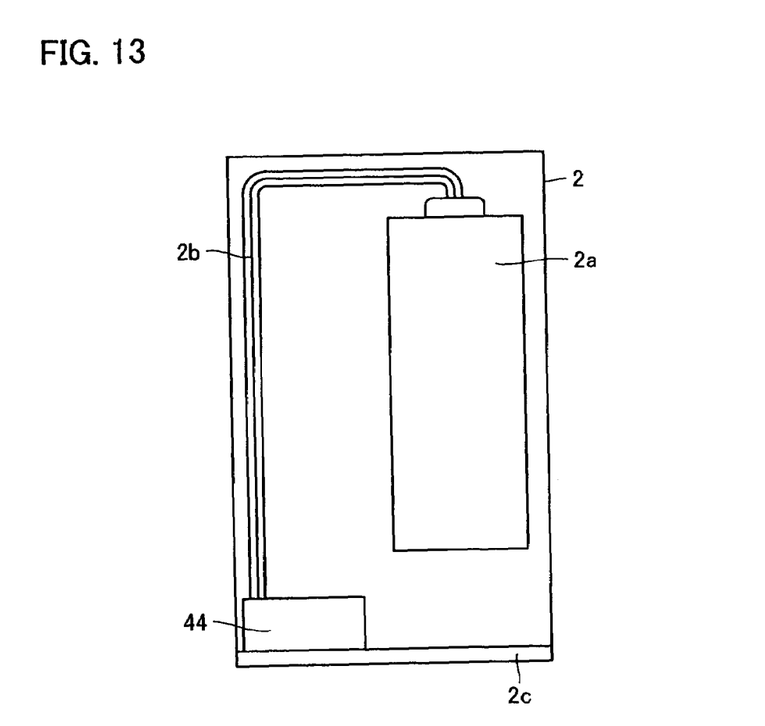
FIG. 13 is a perspective view showing still another example modification of the changeover switch and the lock mechanism combined in the same embodiment.

Furthermore, it is also recommended that as shown in FIG. 13, a switch unit 44 constructed by assembling changeover switch and lock mechanism into one unit as shown in FIG. 13 is provided on the front panel of disc drive apparatus 2 with master-slave setting changeover switch on the back face.

In a case where changeover switch unit 44 is connected to substrate 2a through a cable 2b, manipulation of changeover switch unit 44 is validated and instead, manipulation of changeover switch on the back face is invalidated. In this case, changeover switch unit 44 is mounted by removing a front panel 2c of disc drive apparatus 2.

On the other hand, in a case where changeover switch unit 44 is not provided, manipulation of a changeover switch provided on the back face of a disc drive apparatus is validated and the changeover switch on the back face performs changeover between a master and a slave in working of disc drive apparatus.

With an assembled changeover switch as a unit adopted, not only is the changeover switch provided on the front panel of an existing disc driving apparatus with more of ease, but in a case where the assembled changeover switch as a unit is connected, manipulation of the changeover switch on the front panel is also validated, thereby enabling manipulation of an existing changeover switch provided on the back face to be invalidated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc drive apparatus for reading information from or writing information onto a disc, comprising:

a changeover switch, provided on a front face portion, and used for altering settings between a master and a slave in working of a disc drive body, a cover provided so as to cover said changeover switch and a lock mechanism for locking said cover, wherein said lock mechanism includes:

a pair of electromagnets arranged so as to face each other;

an opening formed in said cover; and a protrusion disposed on one of said pair of electromagnets at a location where it is inserted through said opening by the action of said pair of electromagnets in an on state while, in an off state, being disposed at a location where it is not inserted through said opening by the action of said pair of electromagnets.

2. A disc drive apparatus for reading information from or writing information onto a disc, comprising:

a changeover switch provided on a front face portion and used for altering settings between a master and a slave in working of a disc drive body, and a lock mechanism preventing manipulation of said changeover switch in an on state, wherein said lock mechanism includes:

a cover provided so as to cover said changeover switch in an on state and an opening/closing check section preventing said cover from opening in an on state.

3. The disc drive apparatus according to claim 2, wherein said opening/closing check section includes:

a pair of electromagnets provided so as to face each other;

an opening formed in said cover; and a protrusion disposed on one of said pair of electromagnets so that it is inserted through said opening by the action of said pair of electromagnets in an on state while, in an off state, being disposed so that it is not inserted through said opening by the action of said pair of electromagnets.

4. The disc drive apparatus according to claim 2, wherein said opening/closing check section further includes:

a drive section for performing opening and closing of said cover.

5. The disc drive apparatus according to claim 2, wherein said cover is made of a transparent resin.

6. The disc drive apparatus according to claim 5, wherein an access lamp that is lit on in operation is provided in the vicinity of said cover and light from said access lamp is directed to said cover so that said cover is illuminated therewith.

7. A disc drive apparatus for reading information from or writing information onto a disc, comprising:

a changeover switch provided on a front face portion and used for altering settings between a master and a slave in working of a disc drive body, and a lock mechanism preventing manipulation of said changeover switch in an on state, wherein said lock mechanism prevents displacement of the body of said changeover switch when said changeover switch is changed over, and wherein said lock mechanism includes:

one opening provided in said changeover switch body; and a protrusion provided thereon so that it is inserted through said opening in an on state, while being not inserted through said opening in an off state.

8. A disc drive apparatus for reading information from or writing information onto a disc, comprising:

a changeover switch provided on a front face portion and used for altering settings between a master and a slave in working of a disc drive body, and a lock mechanism preventing manipulation of said changeover switch in an on state, wherein said changeover switch and said lock mechanism are assembled into one unit.

\* \* \* \* \*